Sept. 7, 1948.    C. B. JOHNSON    2,448,529
VALVE STOP COLLAR
Filed June 24, 1946

INVENTOR.
CHARLES B. JOHNSON
BY
Strauch & Hoffman
Attorneys.

Patented Sept. 7, 1948

2,448,529

UNITED STATES PATENT OFFICE 2,448,529

VALVE STOP COLLAR

Charles B. Johnson, Pittsburgh, Pa., assignor to Rockwell Manufacturing Company, Pittsburgh, Pa., a corporation of Pennsylvania Application June 24, 1946, Serial No. 678,963

10 Claims. (Cl. 251—154)

This invention relates to stop collars for rotary valves, such as plug-type valves commonly employed to control the flow of fluid through a pipe line.

In the use of such valves, particularly in high pressure pipe lines, it is of first importance to long life and efficient operation that the valve should be either in its fully or open or fully closed position. If the valve is allowed to remain in an intermediate position for any appreciable length of time, the lapped surfaces and the edges of the flow control ports in the valve member and body are exposed to the erosional, pitting or wearing effect of impinging foreign particles which are carried in suspension by the fluid. The severity of this wearing action on the valve parts will be in more or less direct proportion to the velocity of the fluid passing through the valve. It is therefore customary to provide such valves with suitable stop means which limits and determines the rotational movement of the stem of the valve member in each direction so that the ports of the valve member will be disposed either in full and accurate registration with the ports in the valve body or completely out of registration therewith.

Several devices have heretofore been employed for accomplishing this purpose. Thus co-acting stop parts were integrally formed with the valve body and the valve stem. This, however, involves more or less difficult casting problems which increase production costs. The more familiar type of stop means, which has been generally adopted, consists of stop lugs or shoulders integrally cast with the body of the valve and cooperating stop parts formed upon a collar attached to the valve stem and rotatable therewith. The prevailing preference for the latter construction is further due to the fact that the collar may be easily provided with an annular guard flange or lip to surround a boss on the valve body and prevent the entrance of dust or dirt through the valve stem opening to the interior of the valve, to thus serve a dual purpose with more economical production cost of such valves.

The principal difficulty which has heretofore been encountered in the use of such stop collars is in the attachment of the collar to the valve stem with absolute security against either rotation or axial movement with respect thereto so that the stop parts on the collar will under all conditions remain in accurate alignment with the stop parts on the valve body for cooperation therewith. Generally, this collar attachment means has consisted of a simple set screw. However, due to vibratory forces or violent impact of the stop shoulders on the collar with the stop parts on the valve body, such a set screw is inadequate to retain the collar on the valve stem in its initially set position with the stop shoulders thereon in definitely predetermined relation to the stop parts of the valve body so that rotational movement of the valve stem will be properly limited. Also, in the shipment of the valve, the screw may become loosened and the collar separated from the valve stem and lost.

It is the general object and purpose of the present invention to provide a stop collar for rotary valves and attaching means therefor which will effectively overcome the deficiencies of devices heretofore suggested for this purpose.

It is another object of my invention to provide an improved stop collar having self contained, integrally formed means co-acting with the valve stem in the application of the collar thereto and completely adequate to securely lock the collar against rotational or axial movement on the stem and in predetermined axially fixed relation to the stop parts on the valve body.

A further object of the invention resides in the provision of a stop collar formed from heavy gauge sheet metal plate and embodying a valve stem receiving sleeve having a plurality of resiliently yieldable locking tongues struck therefrom to frictionally grip the valve stem and hold the collar against rotational or axial movement.

An additional object of the invention is to provide an improved flange construction on one end of the collar sleeve having a peripheral flaring lip to circumscribe a boss on the valve body and provided with spaced integral extensions forming stop lugs.

It is a still further object of the invention in one embodiment thereof to provide a valve stem receiving sleeve on the collar which is diametrically elongated between the stop lugs, together with a set screw mounted in one end wall of the elongated sleeve to co-act with the valve stem and cause the locking tongues on opposite side walls of the sleeve to equally bite into the side faces of the valve stem and at the same time securely lock the screw in its adjusted position.

With the above and other subordinate objects in view, the invention comprises the improved valve stop collar and the construction and relative arrangement of its several parts, as will hereinafter be more fully described, illustrated in the accompanying drawing and subsequently incorporated in the subjoined claims.

In the drawing wherein I have disclosed one simple and practical embodiment of the invention, and in which similar reference characters designate corresponding parts throughout the several views.

Referring in further detail to the drawings, the stop collar is preferably formed by appropriately constructed stamping dies from heavy gauge sheet metal plate to provide a short sleeve portion 10 and a flange 12 integrally connected with one end of said short sleeve portion on a large radius arc, as indicated at 11. This flange is formed with an annular peripheral lip 13, slightly flared outwardly, and projecting from the opposite side of the plane of said flange with respect to the sleeve 10.

Figure 1:
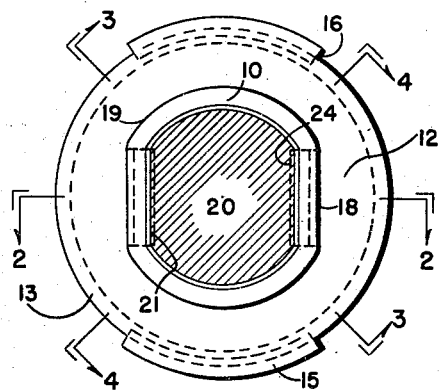
Figure 1 is a plan view showing my novel stop collar in its attached position on a valve stem.

As herein shown, the lip 13 is formed at diametrically opposite sides of the collar with sector-shaped extensions or stop lugs 15 which are of predetermined length and concentric to the axis of the collar. As seen in Figure 1, the end faces of these lugs which form the stop shoulders 16 are equidistantly spaced from the planes represented by the lines 3—3 and 4—4, which intersect at the axis of the collar.

Figure 2:
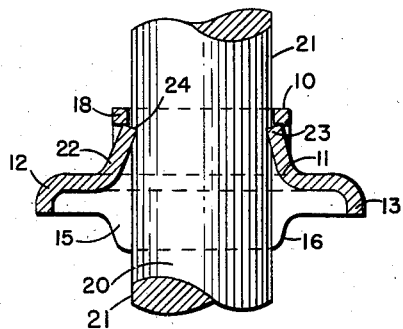
Figure 2 is a diametrical sectional view taken substantially on the line 2—2 of Figure 1.
Figure 3:
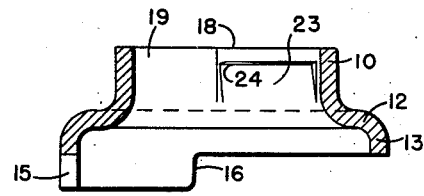
Figure 3 is a similar sectional view of the stop collar removed from the valve stem, taken substantially on the line 3—3 of Figure 1.
Figure 4:
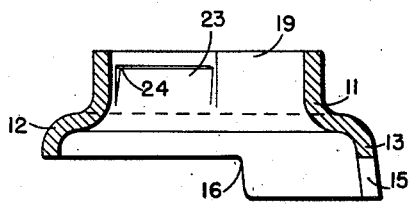
Figure 4 is a similar sectional view of the collar taken substantially on the line 4—4 of Figure 1.

As also shown in Figure 1, the sleeve 10 is preferably elongated in cross-section, the direction of elongation coinciding with the diametrical line which bisects the stop lugs 15. Thus the sleeve portion of the collar is of non-circular form, and embodies the opposite parallel side walls 18 and the curved end walls 19 which may be concentric to the lugs 15. The valve stem, upon which the collar is fitted and indicated at 20 in Figures 1 and 2, may be of generally similar cross-sectional form to the sleeve 10, having the opposite flat side faces 21.

By means of a suitable punching tool, a rectangular tongue 22 is struck inwardly from each side wall 18 of the collar sleeve. In lengthwise dimension, these tongues extend across the major portion of the width of the walls 18 and at one of their ends integrally merge with the curved part 11 of the collar joining the sleeve 10 and flange 12. By application of predetermined pressure by the punching tool, the other free longitudinal ends 23 of the tongues 22 are displaced inwardly at a predetermined distance from the plane of the respective sleeve walls 18 so that the inner edges 24 of the free ends 23 of said tongues, when the latter are outwardly displaced under pressure, will resiliently grip and cut into the opposite side faces 21 of the valve stem 20.

It will be understood that the stop lugs or shoulders on the valve body (not shown) are located in the proper, circumferentially spaced apart relation as dictated by the extent or degree of rotational movement of the valve stem which is required to dispose the valve plug or member in its fully closed or open position. The collar is forced downwardly under pressure over the valve stem 20, the resilient tongues 22 resisting such movement and frictionally bearing against the opposite flat side faces 21 of the stem. It will be understood that in the initial contact of these tongues with the valve stem, they are sprung outwardly from their normal position and placed under high tensional stress so that it is necessary to apply considerable force to the collar flange 12 to move the collar downwardly on the valve stem to its final position, where the stop lugs 15 of the collar are disposed between the spaced stop lugs or shoulders on the valve body and in circumferential alignment therewith. The lower face of the collar flange 12 will be positioned closely adjacent to the end face of the usual boss formed on the valve body while the annular lip 13 of said flange circumscribes the boss externally thereof to effectively exclude the entrance of dust and dirt to the valve stem bore or opening in said boss. In this final set position of the stop collar, the sharp inner edges 24 of the locking tongues 22 cut into the side faces 21 of the valve stem forming shallow shoulders thereon with which the tongues co-act to prevent upward axial movement of the collar on the valve stem. This biting or cutting action of the tongues into the side faces of the stem will be augmented by relative vibratory movement of the parts, such as would tend to loosen the ordinary collar held by the conventional set screw. In the turning movement of the valve stem 20 to open or close the valve, one of the end shoulders 16 on each lug 15 contacts the respective stop lugs or shoulders on the valve body to limit turning movement in one direction while the other shoulders 16 of said lugs 15 contact the stop lugs on the valve body and limit turning movement of the valve stem in the opposite direction, as will be apparent from reference to Figure 1 of the drawings. In the conventional set-screw-attached collar, violent impact between the stop lugs on the collar and the lugs on the valve body frequently results in rotational displacement of the collar on the valve stem, changing the relationship of the collar lugs to those on the valve body. The present invention effectively prevents such rotational displacement of the collar due to impact forces, since the impact force causes one end of each tongue 22 at the edge 24 thereof to further bite into the face of the valve stem, thus positively locking the collar in rigidly fixed relation to the stem and maintaining a permanently fixed cooperative relationship between the collar lugs 15 and the stop lugs on the valve body. Thus it will be seen that my improved collar is provided with a self-contained locking means which automatically functions in the application of the collar to the valve stem to positively secure the collar to the valve stem in its final set position against either rotational or axial movement relative to said valve stem and the valve body.

Figure 5:
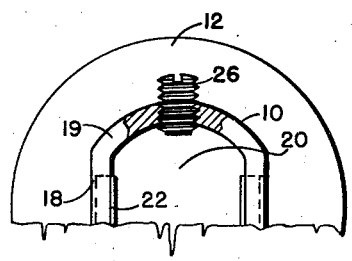
Figure 5 is a detail horizontal section illustrating an auxilary locking means for the collar.

In the application of my improved stop collar to certain types of valves, it may be found desirable, as an additional precautionary measure, to provide an auxiliary means carried by the collar for increasing the effectiveness of the locking action of the spring tongues 22. To this end, as shown in Figure 5, one of the curved end walls 19 of the sleeve 10 may be provided with a tapped opening receiving the set screw 26. The inner end of this screw has bearing contact with the valve stem 20 and by adjustment thereof, distorting stresses are set up in the walls of the sleeve 10, having a tendency to further elongate said sleeve. The arc of the wall 19 in which the set screw is mounted will be shortened or contracted, thereby tending to force the parallel side walls 18 of the sleeve towards the valve stem and increasing the cutting pressure of the edges 24 of the locking tongues 22 into the faces 21 of the valve stem. Thus the corresponding end edges of the tongues 22, coacting with the shoulders on the faces of the valve stem, will effectively prevent any eccentric displacement of the collar relative to the axis of the valve stem under the pressure of screw 26 so that the accurate circumferential alignment of stop shoulders 16 with the stop shoulders or lugs on the valve body will not be disturbed. It will further be evident that in the adjustment of the screw 26 and the change in curvature of the sleeve wall 19, the helix angle of the thread therein is changed, thereby causing a tight binding pressure of said threads against the threads on the screw 26 and securely locking the latter against casual rotation from its adjusted position.

From the foregoing description, it will be appreciated that I have provided a combined stop collar and dust-excluding cover, for rotary valves, of novel construction which will reliably function under all conditions of use to definitely limit rotary movement of the valve plug or member to its fully open or completely closed position, whereby a maximum period of useful service will be obtained without repair or replacement of the valve parts. Material production economies are realized by the construction of the improved stop collar in the form of a simple sheet metal stamping. Of course, it will be evident that the stop collar may be manufactured either with or without the auxiliary set screw 26 and that the cross-sectional form of the sleeve 10 and the number and arrangement of the locking tongues 22 may be varied as the circumstances of a particular application or use might require. Finally, it will be seen that the improved stop collar is of structurally rugged and durable form, and after being assembled on the valve stem for shipment, cannot be accidentally displaced therefrom and lost.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A stop collar for rotary valves having a body provided with stop means and a valve stem projecting therefrom, comprising a die-stamped sheet metal member having a sleeve portion to receive the valve stem and a flange portion at one end of said sleeve portion provided with spaced stop lugs to contact the stop means on the valve body and limit rotation of the valve stem in each direction, and a plurality of resiliently yieldable locking tongues struck inwardly from the wall of said sleeve, projecting from said flange toward the opposite end of the sleeve and having free end edges adapted to bite into surfaces of the valve stem and lock said collar against axial or rotative movement on the stem in axially fixed relation to the valve body.

2. The stop collar as defined in claim 1 wherein said sleeve is formed with opposite parallel side walls and a locking tongue is struck inwardly from each of said walls to engage a flat side face of the valve stem.

3. The stop collar as defined in claim 1, in which said flange is formed with an outwardly flaring annular lip and said stop lugs constitute circumferentially spaced integral extensions of said lip.

4. A stop collar for rotary valves having a body provided with stop means and a valve stem projecting therefrom, comprising a die-stamped sheet metal member having a diametrically elongated sleeve portion to receive the valve stem and an outwardly extending flange portion at one end of said sleeve portion provided with spaced stop lugs projecting from the opposite side of said flange portion with respect to the sleeve and adapted to contact the stop means on the valve body and limit rotation of the valve stem in each direction, and a resiliently yieldable locking tongue struck inwardly from a side wall of said sleeve portion, resiliently stressed in the application of the collar to the valve stem to cause a free end edge of said tongue to bite into a flat side face of the valve stem and lock said collar against axial or rotative movement relative to the valve stem and in axially fixed relation to the valve body.

5. The stop collar as defined in claim 4, wherein said flange is formed with an annular, peripheral, dust-excluding lip and said stop lugs constitute circumferentially spaced integral extensions of said lip.

6. The stop collar as defined in claim 4, in which the walls of said sleeve and said tongue at one of its ends merge with said flange on a large radius arc.

7. A stop collar for rotary valves having a body provided with stop means and a valve stem projecting therefrom, comprising a member having a valve stem receiving sleeve provided with an outwardly extending annular flange at one end having circumferentially spaced stop lugs to engage the stop means on the valve body, and self-contained locking means for said collar embodying opposed resilient locking tongues projecting inwardly from the sleeve wall to respectively exert biting pressure at their free ends against a side face of the valve stem and prevent rotary displacement of the collar on the valve stem by impact forces incident to contact between said stop lug and the stop means on the valve body.

8. The stop collar as defined in claim 7, in which said locking tongues are struck from the wall of said sleeve and integrally merge with said annular flange at the juncture of the sleeve wall therewith.

9. The stop collar as defined in claim 7, wherein said sleeve is diametrically elongated and embodies substantially parallel side walls, and wherein a resilient locking tongue is struck inwardly from each of said side walls having an effective length at its free end approximately coextensive with the width of said wall.

10. The stop collar as defined in claim 7, in which said sleeve is diametrically elongated and embodies substantially parallel side walls connected by curved end walls substantially concentric with the collar and wherein a resilient locking tongue is struck inwardly from each of said side walls, together with auxiliary locking means comprising a screw adjustably threaded in one end wall of the sleeve for bearing contact against the valve stem to distortionally stress the sleeve walls and increase the biting locking pressure of said tongues against the valve stem.

CHARLES B. JOHNSON.

REFERENCES CITED

The following references are of record in the file of this patent:

UNITED STATES PATENTS

| Number | Name | Date |
| --- | --- | --- |
| 1,426,731 | Harris | Aug. 22, 1922 |